United States Patent
Kanoya et al.

(10) Patent No.: US 7,060,120 B1
(45) Date of Patent: Jun. 13, 2006

(54) HYDROGEN ABSORBING ALLOY POWDER AND HYDROGEN STORING TANK FOR MOUNTING IN A VEHICLE

(75) Inventors: Izuru Kanoya, Saitama (JP); Takanori Suzuki, Saitama (JP); Mitsuya Hosoe, Saitama (JP); Hajime Goto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 261 days.

(21) Appl. No.: 10/674,018

(22) Filed: Sep. 30, 2003

Related U.S. Application Data

(62) Division of application No. 09/866,783, filed on May 30, 2001, now Pat. No. 6,656,246.

(30) Foreign Application Priority Data

| May 31, 2000 | (JP) | 2000-166480 |
| Feb. 20, 2001 | (JP) | 2001-44088 |
| May 11, 2001 | (JP) | 2001-142250 |

(51) Int. Cl.
*C22C 23/00* (2006.01)
(52) U.S. Cl. ............ 75/255; 148/420; 420/900
(58) Field of Classification Search ........ 75/255; 148/420
See application file for complete search history.

(56) References Cited

U.S. PATENT DOCUMENTS

| 5,078,962 A | * | 1/1992 | Regazzoni et al. ......... 420/402 |
| 5,147,603 A | * | 9/1992 | Nussbaum et al. ......... 420/409 |
| 5,964,965 A | | 10/1999 | Schulz et al. |
| 6,387,152 B1 | | 5/2002 | Klassen et al. |
| 6,478,844 B1 | | 11/2002 | Ovshinsky |

FOREIGN PATENT DOCUMENTS

| EP | 0 510 918 A | | 10/1992 |
| JP | 2000-265233 A | * | 9/2000 |
| WO | 96/23906 | | 8/1996 |

* cited by examiner

*Primary Examiner*—George P. Wyszomierski
(74) *Attorney, Agent, or Firm*—Arent Fox PLLC

(57) ABSTRACT

To produce a hydrogen absorbing alloy powder which is an aggregate of alloy particles each including a metal matrix and added-components, an aggregate of metal matrix particles and an aggregate of added-component particles are used, and mechanical alloying is carried out. In this case, the relationship between the particle size D of the metal matrix particles and the particle size $d$ of the added-component particles is set at $d \leq D/6$. Thus, the milling time can be shortened remarkably.

4 Claims, 14 Drawing Sheets

HYDROGEN ABSORBING ALLOY POWDER AND HYDROGEN STORING TANK FOR MOUNTING IN A VEHICLE

This is a divisional application No. 09/866,783 filed May 30, 2001. The disclosure of the prior application is hereby incorporated by reference herein in its entirety now U.S. Pat. No. 6,656,246.

BACKGROUND OF THE INVENTION

1. Field of the Invention

The present invention relates to a process for producing a hydrogen absorbing alloy powder, and particularly to a process for producing a hydrogen absorbing alloy powder which is an aggregate of alloy particles each comprising a metal matrix and added-components, by conducting one of mechanical alloying and mechanical grinding, using an aggregate of metal matrix particles and an aggregate of added-component particles. The present invention also relates to a hydrogen absorbing alloy powder and to a hydrogen-storing tank including such hydrogen absorbing alloy powder therein.

2. Description of the Related Art

In this type of the producing process, a method is conventionally employed, in which metal matrix particles and added-component particles having the same particle size (usually 1 μm or more) or the substantially same particle size are used, and relatively hard added-component particles are sufficiently finely-milled, and then made to penetrate and dispersed uniformly into the metal matrix particles.

However, the above conventional process suffers from a problem that milling must be carried out, for example, for several ten hours in order that the added-component particles may be finely milled and made to penetrate and dispersed uniformly, resulting in an increased manufacture cost for the hydrogen absorbing alloy powder.

Various hydrogen absorbing alloy powders are conventionally known. However, the conventionally known hydrogen absorbing alloy powders are accompanied by a problem that a hydrogen storage capacity and a rate of hydrogen absorption/desorption are insufficient for the purpose of using such hydrogen absorbing alloy powder as being mounted in a fuel cell electric vehicle.

SUMMARY OF THE INVENTION

Accordingly, it is an object of the present invention to provide a process for producing a hydrogen absorbing alloy powder of the above-described type, wherein the milling time can be shortened remarkably.

To achieve the above object, according to the present invention, there is provided a process for producing a hydrogen absorbing alloy powder which is an aggregate of alloy particles each comprising a metal matrix and added-components, by conducting one of a mechanical alloying and a mechanical grinding, using an aggregate of metal matrix particles and an aggregate of added-component particles, wherein the relationship between the particle size D of the metal matrix particles and the particle size $\underline{d}$ of the added-component particles is set at $d \leq D/6$.

When the hydrogen absorbing alloy powder is produced by employing mechanical alloying or the like, metal matrix particles having a particle size D of about 5 μm are usually used. Therefore, the particle size $\underline{d}$ of the added-component particles is equal to or smaller than 834 nm ($d \leq 834$ nm) in the case of D=5 μm, because the particle size $\underline{d}$ of the added-component particles is set at $d \leq D/6$. The added-component particles having such a particle size are fine particles or ultra-fine particles and have a very high activity. Therefore, not only by making the added-component particles penetrate into the metal matrix particles, but also by retaining the added-component particles on surfaces of the metal matrix particles, a highly active hydrogen absorbing alloy powder can be produced. In addition, the metal matrix particles are fine or ultra-fine particles and hence, it is unnecessary to finely mill the metal matrix particles by milling.

Thus, according to the above-described process, it is possible to remarkably shorten the milling time for producing the hydrogen absorbing alloy powder, for example, from 40 hours to 15 minutes. However, when the relationship between the particle sizes D and $\underline{d}$ is $d > D/6$, the milling time is longer, and the producing energy is inefficient.

It is another object of the present invention to provide a hydrogen absorbing alloy powder of the above-described type which is suitable to be used for mounting in a vehicle, and which presents a large hydrogen storage capacity and a high rate of hydrogen absorption/desorption.

To achieve the above object, according to the present invention, there is provided a hydrogen absorbing alloy powder which is an aggregate of alloy particles each including an Mg matrix and a plurality of ultra-fine particles dispersed in the Mg matrix, the Mg matrix including a plurality of Mg crystals having a grain size $D_C$ in a range of $1.0 \ \mu m \leq D_C \leq 500 \ \mu m$, and the ultra-fine particles having a particle size $d_0$ in a range of $10 \ nm \leq d_0 \leq 500 \ nm$, the ultra-fine particles being at least one type selected from the group consisting of Ni ultra-fine particles, Ni alloy ultra-fine particles, Fe ultra-fine particles, Fe alloy ultra-fine particles, V ultra-fine particles, V alloy ultra-fine particles, Mn ultra-fine particles, Mn alloy ultra-fine particles, Ti ultra-fine particles, Ti alloy ultra-fine particles, Cu ultra-fine particles, Cu alloy ultra-fine particles, Al ultra-fine particles, Al alloy ultra-fine particles, Pd ultra-fine particles, Pd alloy ultra-fine particles, Pt ultra-fine particles, Pt alloy ultra-fine particles, Zr ultra-fine particles, Zr alloy ultra-fine particles, Au ultra-fine particles, Au alloy ultra-fine particles, Ag ultra-fine particles, Ag alloy ultra-fine particles, Co ultra-fine particles, Co alloy ultra-fine particles, Mo ultra-fine particles, Mo alloy ultra-fine particles, Nb ultra-fine particles, Nb alloy ultra-fine particles, Cr ultra-fine particles, Cr alloy ultra-fine particles, Zn ultra-fine particles, Zn alloy ultra-fine particles, Ru ultra-fine particles, Ru alloy ultra-fine particles, Rh ultra-fine particles, Rh alloy ultra-fine particles, Ta ultra-fine particles, Ta alloy ultra-fine particles, Ir ultra-fine particles, Ir alloy ultra-fine particles, W ultra-fine particles and W alloy ultra-fine particles.

The hydrogen absorbing alloy powder has a very high activity attributable to its fine metallographic structure and hence, presents a large hydrogen storage capacity and a high rate of hydrogen absorption/desorption without conducting an activating procedure, because the powder is the aggregate of alloy particles each including the Mg matrix having the crystal grain size $D_C$ on the order of μm, and the ultra-fine particles having the particle size $d_0$ on the order of nm and dispersed in the Mg matrix, as described above.

However, if the crystal grain size $D_C$ is smaller than 1.0 μm, the process of production of the hydrogen absorbing alloy powder is complicated and for this reason, it is difficult to mass-produce the hydrogen absorbing alloy powder. On the other hand, if $D_C > 500$ μm, the rate of hydrogen absorption/desorption presented by the hydrogen absorbing alloy powder is reduced. If the particle size $d_0$ is smaller than 10 nm, the activity of the ultra-fine particles is too high and hence, it is difficult to handle the ultra-fine particles. On the other hand, if $d_0 > 500$ nm, the hydrogen storage capacity in the hydrogen absorbing alloy powder is decreased, and the rate of hydrogen absorption/desorption is lowered.

In addition, according to the present invention, there is provided a hydrogen absorbing alloy powder which is an aggregate of alloy particles each including a Ti—Fe alloy matrix and a plurality of ultra-fine particles dispersed in the Ti—Fe alloy matrix, the Ti—Fe alloy matrix including a plurality of Ti—Fe alloy crystals having a grain size DC in a range of $1.0 \ \mu m \leq D_C \leq 500 \ \mu m$, and the ultra-fine particles having a particle size $d_0$ in a range of $10 \ nm \leq d_0 \leq 500 \ nm$, the ultra-fine particles being at least one type selected from the group consisting of Ni ultra-fine particles, Ni alloy ultra-fine particles, Fe ultra-fine particles, Fe alloy ultra-fine particles, V ultra-fine particles, V alloy ultra-fine particles, Mn ultra-fine particles, Mn alloy ultra-fine particles, Ti ultra-fine particles, Ti alloy ultra-fine particles, Cu ultra-fine particles, Cu alloy ultra-fine particles, Al ultra-fine particles, Al alloy ultra-fine particles, Pd ultra-fine particles, Pd alloy ultra-fine particles, Pt ultra-fine particles, Pt alloy ultra-fine particles, Zr ultra-fine particles, Zr alloy ultra-fine particles, Au ultra-fine particles, Au alloy ultra-fine particles, Ag ultra-fine particles, Ag alloy ultra-fine particles, Co ultra-fine particles, Co alloy ultra-fine particles, Mo ultra-fine particles, Mo alloy ultra-fine particles, Nb ultra-fine particles, Nb alloy ultra-fine particles, Cr ultra-fine particles, Cr alloy ultra-fine particles, Zn ultra-fine particles, Zn alloy ultra-fine particles, Ru ultra-fine particles, Ru alloy ultra-fine particles, Rh ultra-fine particles, Rh alloy ultra-fine particles, Ta ultra-fine particles, Ta alloy ultra-fine particles, Ir ultra-fine particles, Ir alloy ultra-fine particles, W ultra-fine particles and W alloy ultra-fine particles.

This hydrogen absorbing alloy powder also presents a large hydrogen storage capacity and a high rate of hydrogen absorption/desorption, as does the above-described hydrogen absorbing alloy powder. The grain size $D_C$ and the particle size $d_0$ are limited for the same reason as described above.

Further, according to the present invention, there is provided a hydrogen-storing tank for mounting in a vehicle and including a hydrogen absorbing alloy powder therein, the hydrogen absorbing alloy powder being an aggregate of alloy particles each including an Mg matrix and a plurality of ultra-fine particles dispersed in the Mg matrix, the Mg matrix including a plurality of Mg alloy crystals having a grain size $D_C$ in a range of $1.0 \ \mu m \leq D_C \leq 500 \ \mu m$, and the ultra-fine particles having a particle size $d_0$ in a range of $10 \ nm \leq d_0 \leq 500 \ nm$, the ultra-fine particles being at least one type selected from the group consisting of Ni ultra-fine particles, Ni alloy ultra-fine particles, Fe ultra-fine particles, Fe alloy ultra-fine particles, V ultra-fine particles, V alloy ultra-fine particles, Mn ultra-fine particles, Mn alloy ultra-fine particles, Ti ultra-fine particles, Ti alloy ultra-fine particles, Cu ultra-fine particles, Cu alloy ultra-fine particles, Al ultra-fine particles, Al alloy ultra-fine particles, Pd ultra-fine particles, Pd alloy ultra-fine particles, Pt ultra-fine particles, Pt alloy ultra-fine particles, Zr ultra-fine particles, Zr alloy ultra-fine particles, Au ultra-fine particles, Au alloy ultra-fine particles, Ag ultra-fine particles, Ag alloy ultra-fine particles, Co ultra-fine particles, Co alloy ultra-fine particles, Mo ultra-fine particles, Mo alloy ultra-fine particles, Nb ultra-fine particles, Nb alloy ultra-fine particles, Cr ultra-fine particles, Cr alloy ultra-fine particles, Zn ultra-fine particles, Zn alloy ultra-fine particles, Ru ultra-fine particles, Ru alloy ultra-fine particles, Rh ultra-fine particles, Rh alloy ultra-fine particles, Ta ultra-fine particles, Ta alloy ultra-fine particles, Ir ultra-fine particles, Ir alloy ultra-fine particles, W ultra-fine particles and W alloy ultra-fine particles.

The hydrogen-storing tank includes therein the hydrogen absorbing alloy powder presenting a large hydrogen storage capacity and a high rate of hydrogen absorption/desorption, as described above and hence, is suitable to be mounted in a vehicle. The grain size $D_C$ and the particle size $d_0$ are limited for the same reason as described above.

DESCRIPTION OF THE PREFERRED EMBODIMENTS

First Embodiment

Figure 1:
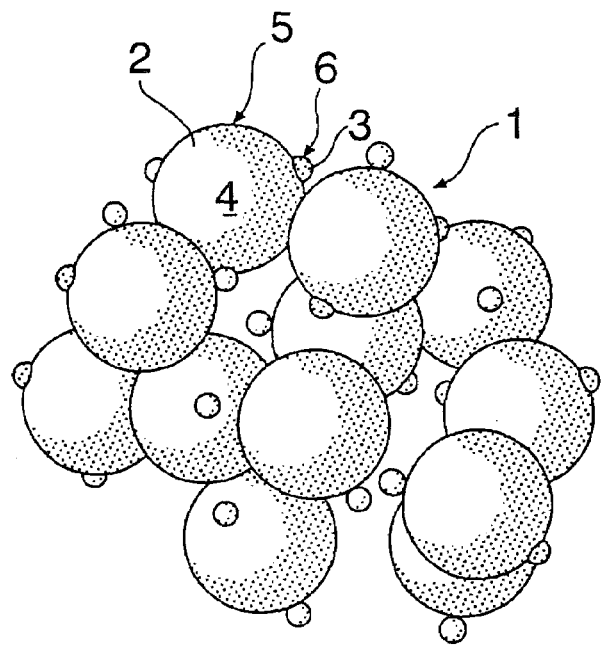
FIG. 1 is a diagram for explaining a hydrogen absorbing alloy powder.
Figure 2:
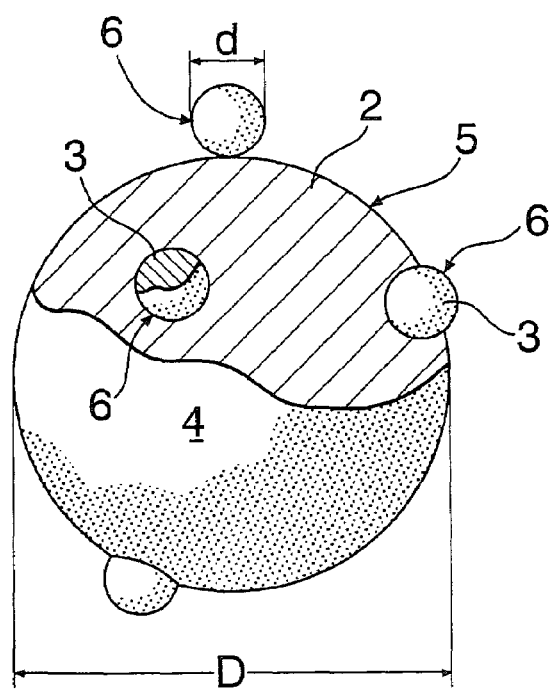
FIG. 2 is a diagram of an alloy particle of the hydrogen absorbing alloy powder with its essential portion being broken away.

Referring to FIGS. 1 and 2, a hydrogen absorbing alloy powder 1 is an aggregate of alloy particles 4 each comprising a metal matrix 2 and added components 3.

To produce the hydrogen absorbing alloy powder 1, a process is employed, in which one of a mechanical alloying and a mechanical grinding is carried out using an aggregate of metal matrix particles 5 (a metal matrix powder) and an aggregate of added-component particles 6 (an added-component powder).

In this case, the relationship between the particle size D of the metal matrix particles 5 and the particle size d of the added-component particles 6 is set at $d \leq D/6$. For example, the particle size of the metal matrix particles 5 is $D \geq 3 \ \mu m$, preferably, $D \geq 5$ μm, and the added-component particles 6 have the particle size $d \leq 500$ nm. The relationship between the particle sizes D and $\underline{d}$ is preferably in a range of $D/1000 \leq \underline{d} \leq D/20$, and the amount L of added-component particles added in a range of 0.1% by atom $\leq L \leq 5.0\%$ by atom, preferably, $0.3 \leq L \leq 3.0\%$ by atom.

Examples of the metal matrix particles 5 are TiCrV based particles, TiCrMn based particles and the like which are body-centered cubic crystal particles, Mg particles and V particles; and $AB_5$ based particles (A represents a metal element capable of reacting with hydrogen, and B represents a metal element incapable of reacting with hydrogen) such as $LaNi_5$ particles, $MmNi_5$ (Mm represents misch metal) particles, $CaNi_5$ particles and the like; $AB_2$ based particles such as $MgZn_2$ particles, $ZrNi_2$ particles and the like; AB based particles such as TiNi particles, TiFe particles and the like; $A_2B$ based particles such as $Mg_2Ni$ particles, $Ca_2Fe$ particles and the like. One type selected from the above-listed types of particles is used as metal matrix particles. Examples of the added-component particles 6 which may be used are one type of particles selected from the group consisting of Ni particles, Ni-alloy particles, Fe particles, Fe-alloy particles, V particles, V-alloy particles, Mn particles, Mn-alloy particles, Ti particles, T-alloy particles, Cu particles, Cu-alloy particles, Al particles, Al-alloy particles, Pd particles, Pd-alloy particles, Pt particles, Pt alloy particles, Zr particles, Zr-alloy particles, Au particles, Au-alloy particles, Ag particles, Ag-alloy particles, Co particles, Co-alloy particles, Mo particles, Mo-alloy particles, Nb particles, Nb-alloy particles, Cr particles, Cr-alloy particles, Zn particles, Zn-alloy particles, Ru particles, Ru-alloy particles, Rh particles, Rh-alloy particles, Ta particles, Ta-alloy particles, Ir particles, Ir-alloy particles, W particles and W-alloy particles.

In the mechanical alloying or the mechanical grinding, the milling time $\underline{t}$ is set at a smaller value in a range of 1 min $\leq t \leq 5$ hr. If the milling time is set at a smaller value as described above, the following phenomenon appears: As best shown in FIG. 2, some added-component particles 6 in the aggregate of the added-component particles 6 completely penetrate into the metal matrix particles 5 to bond with the particles 5, and some other added-component particles 6 are deposited to surfaces of the metal matrix particles 5 to bond with the particles 5, and some further added-component particles 6 are embedded in the metal matrix particles 5 to bond with them while being partially exposed to surfaces of the metal matrix particles 5 and.

The added-component particles 6 having a particle size on the order of nm level as described above are ultra-fine particles (or particulates) and have a very high activity. Therefore, by ensuring not only that the added-component particles 6 are permitted to enter into the metal matrix particles 5, but also that they are retained on the surfaces of the metal matrix particles 5, the highly active hydrogen absorbing alloy powder 1 can be produced. In addition, because the added-component particles 6 are ultra-fine particles (or particulates), it is unnecessary to finely grind the added-component particles 6 by milling. If the relationship between the particle sizes D and $\underline{d}$ is $D/1000 > d$, a difference in energy between the metal matrix particles 5 and the added-component particles 6 is too large, and for this reason, the added-component particles 6 cannot enter into the metal matrix particles 5.

Particular examples of production of hydrogen absorbing alloy powders utilizing the mechanical alloying will be described below.

EXAMPLE 1 OF PRODUCTION

An aggregate of Mg particles (as metal matrix particles) having a purity of 99.9% and a particle size D of 10 μm and an aggregate of Fe particles (as added-component particles) having a purity of 99.9% and a particle size $\underline{d}$ of 20 nm were weighed to provide an alloy composition of $Mg_{97}Fe_3$ (the unit of each of numerical values was % by atom), thereby producing a total of 2.5 g of a mixture powder. This mixture powder was placed into a container (made of JIS SUS316) having a volume of 80 ml of a planetary-type ball mill (P-5 made by Furitsch) together with 18 balls (made of JIS SUS316) having a diameter of 10 mm, and subjected to ball milling with the inside of the container maintained at a hydrogen gas atmosphere of 2.0 MPa under conditions of a container-rotational speed of 780 rpm, a disk-rotational speed of 360 rpm and milling time $\underline{t}$ of 15 minutes. In this case, an acceleration 9 G nine-times a gravity acceleration G was generated in the container. After the ball milling, the hydrogen absorbing alloy powder was taken up in a globe box. This alloy powder is hereinafter called an example (A2).

For comparison, another hydrogen absorption alloy powder was produced in the same manner, except that the above-described aggregate of Mg particles and an aggregate of Fe particles having a particle size $\underline{d}$ of 10 μm which is the same particle size as that of the Mg particles were used, and the milling time $\underline{t}$ was set at 3 hours. This alloy powder is hereinafter called an example (B2).

Figure 3:
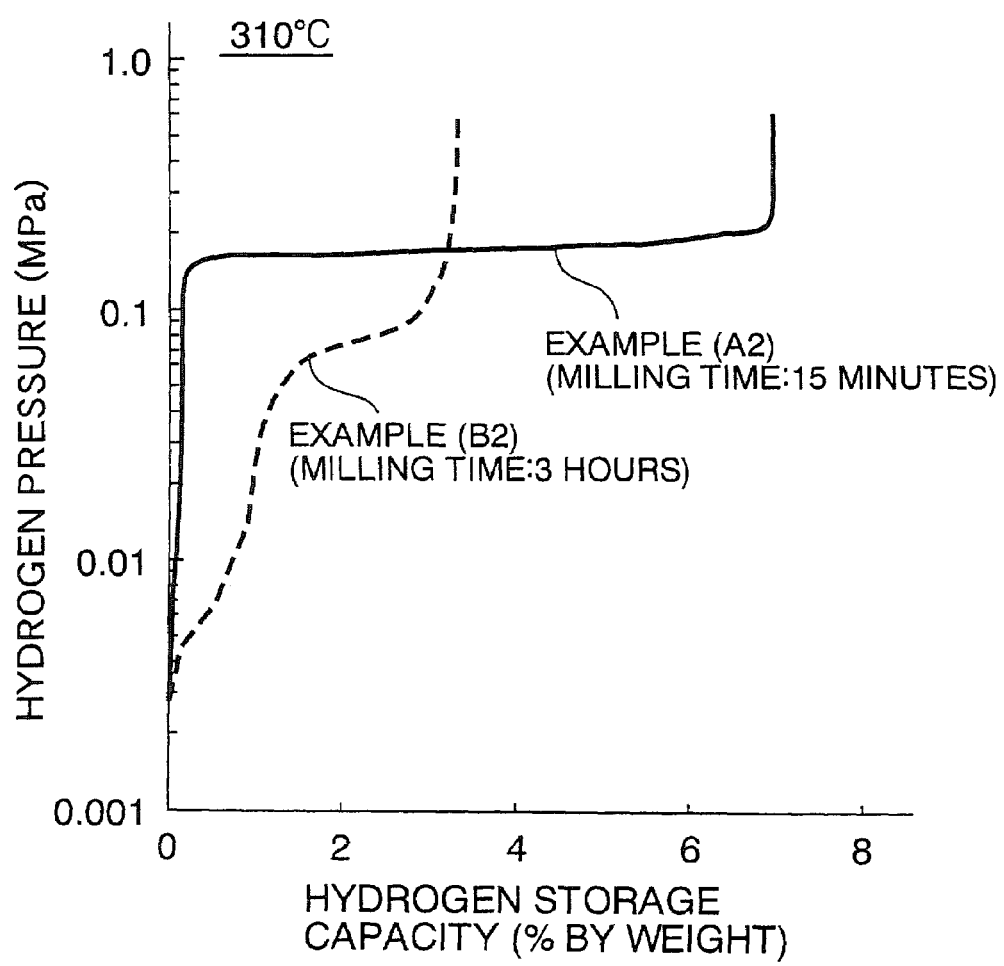
FIG. 3 is a pressure-composition diagram of examples (A2) and (B2) of hydrogen absorbing alloy powders.

The examples (A2) and (B2) were subjected to a dehydrogenating procedure under the same condition as in Production Example 1, followed by measurement for a pressure-composition diagram. FIG. 3 shows a pressure-composition diagram (waiting time: 5 minutes; 310° C., desorption) of the examples (A2) and (B2). It can be seen from FIG. 3 that the example (A2) was produced in a short milling time which is 1/12 of the milling time for the example (B2), but has a pressure-composition diagram more excellent than that of the example (B2). In the example (A2), the maximum amount of hydrogen desorbed was presented in the waiting time of 5 minutes, and it can be seen from this fact that the rate of hydrogen-desorption is higher.

Figure 4:
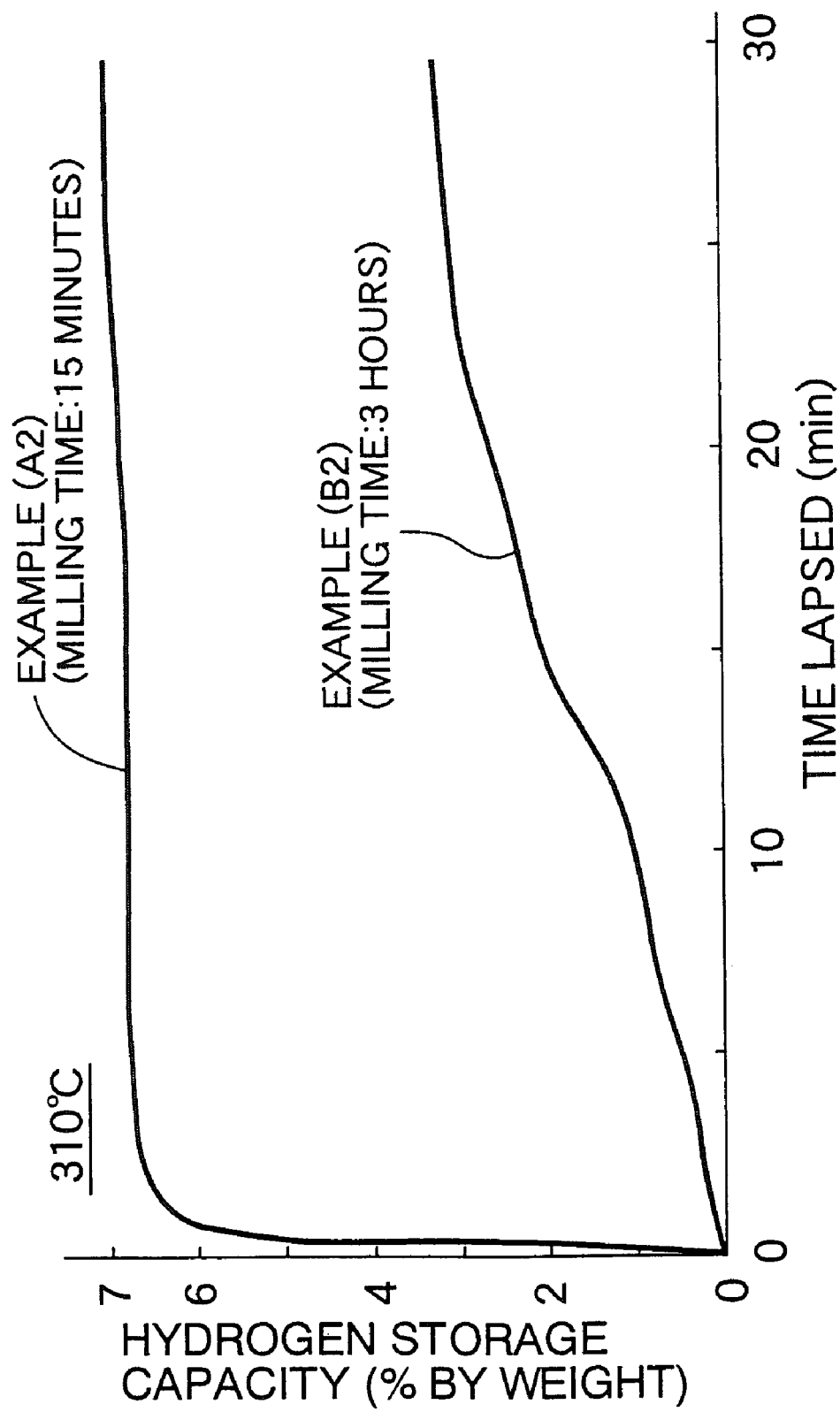
FIG. 4 is a diagram showing hydrogen-absorption characteristics of the examples (A2) and (B2) of hydrogen absorbing alloy powders.

FIG. 4 shows results of a hydrogenating rate test at a measuring temperature of 310° C. for the examples (A2) and (B2). In this test, the application of a high hydrogen pressure of 4.0 MPa was carried out from a vacuum state. It can be seen from FIG. 4 that the hydrogenating rate for the example (A2), namely, the rate of hydrogen absorption is high, and the hydrogen storage capacity is large, as compared with the example (B2).

EXAMPLE 2 OF PRODUCTION (1) An aggregate of Mg particles (as metal matrix particles) having a purity of 99.9% and a particle size D of 10 μm and an aggregate of Ni particles (as added-component particles) having a purity of 99.9% and a particle size $\underline{d}$ of 20 nm were weighed to provide an alloy composition of $Mg_{97}Ni_3$ (the unit of each of numerical values was % by atom), thereby producing a total of 2.5 g of a mixture powder. This mixture powder was placed into a container (made of JIS SUS316) having a volume of 80 ml of a planetary-type ball mill (P-5 made by Furitsch) together with 18 balls (made of JIS SUS316) having a diameter of 10 mm, and subjected to ball milling with the inside of the container maintained at a hydrogen gas atmosphere of 1.0 Mpa under conditions of a container-rotational speed of 780 rpm, a disk-rotational speed of 360 rpm and milling time t of 15 minutes. In this case, an acceleration 9 G nine-times a gravity acceleration G was generated in the container. After the ball milling, the hydrogen absorbing alloy powder was taken up in a globe box. This alloy powder is hereinafter called an example (A3).

Figure 5:
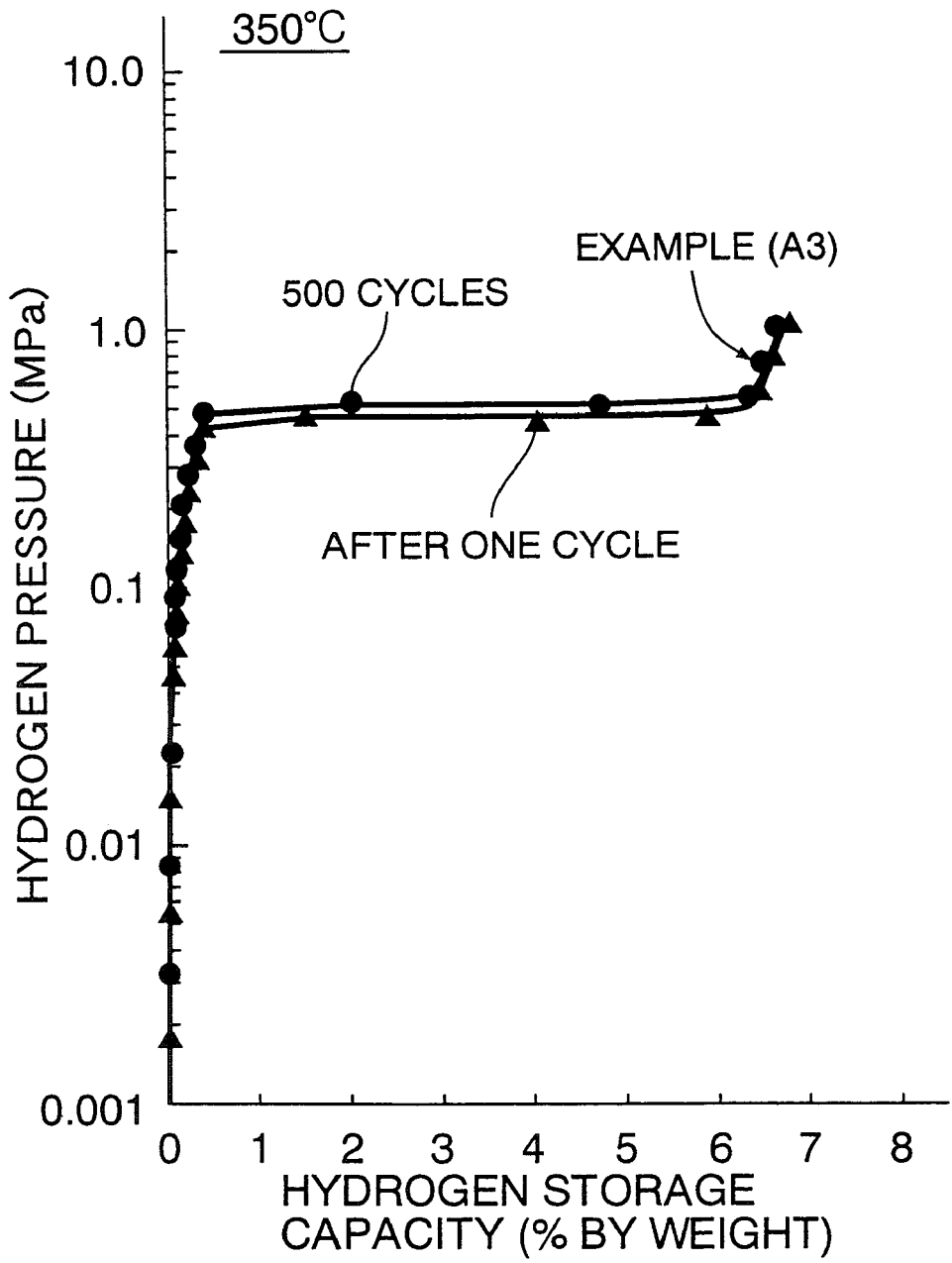
FIG. 5 is a pressure-composition diagram of an example (A3) of a hydrogen absorbing alloy powder.

The example (A3) was subjected to a dehydrogenating procedure under the same conditions as in Production Example 1 and then to a pressure-composition diagram. FIG. 5 shows a pressure-composition diagram of the Example (A3) (waiting time: 5 minutes; 350° C., desorption). In FIG. 5, the pressure-composition diagram after one cycle (in which one run of the absorption and desorption of hydrogen was carried out) is represented by a line made by connecting a plurality of black triangular points one by one, and the pressure-composition diagram after 500 cycles is represented by a line connecting a plurality of black circular points one by one.

It can be seen from FIG. 5 that the example (A3) has an excellent pressure-composition diagram and a good durability.

(2) Four types of hydrogen absorbing alloy powders were produced using a mixture power ($Mg_{97}Ni_3$) similar to that in the item (1) under the same conditions as in the above-described item (1), except that the acceleration generated in the container was changed to 0.5 G, 3 G, 6 G and 9 G by regulating the container-rotational speed and the disk-rotational speed. These hydrogen absorbing alloy powders are hereinafter called an example (A4) made by application of 0.5 G, an example (A5) made by application of 3 G, an example (A6) made by application of 6 G, and an example (A7) made by application of 9 G (same as in the example (A3)), respectively.

The Examples (A4) to (A7) were subjected to a dehydrogenating procedure under the same conditions as in Production Example 1 and then to a pressure-composition diagram. In addition, a similar pressure-composition diagram was carried out for the following examples: an example (B3) of a powder produced using a mixture powder ($Mg_{97}Ni_3$) similar to that in the item (1) by sequentially carrying out vacuum arc melting, formation of an ingot by casting and pulverization of the ingot in the atmosphere, and an example (C) produced by mixing, in a mortar, an aggregate of the Mg particles and the Ni particles weighed to provide the alloy composition ($Mg_{97}Ni_3$).

Figure 6:
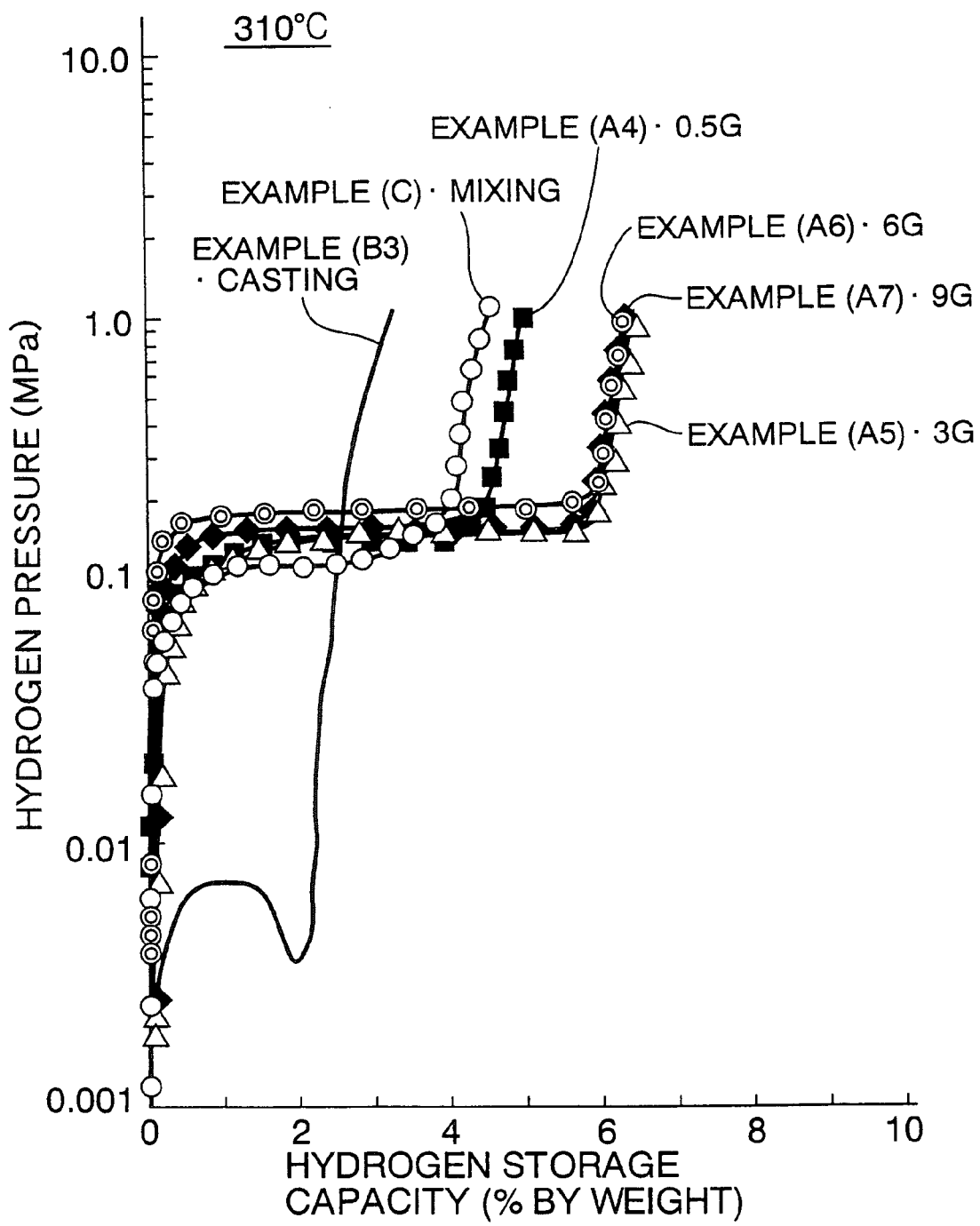
FIG. 6 is a pressure-composition diagram of examples (A4) to (A7), (B3) and (C) of hydrogen absorbing alloy powders.

FIG. 6 shows a pressure-composition diagram (waiting time: 5 minutes; 310° C., desorption) of the examples (A4) to (A7), (B3) and (C). As apparent from FIG. 6, the example (C) made by the mixing in the mortar has the pressure-composition diagram more excellent than that of the Example (B3) made through the casting. This is attributable to the presence of the highly active Ni particles which are ultra-fine particles. The example (A4) made by application of the acceleration of 0.5 G has a pressure-composition diagram enhanced more than that of the example (C) with the start and advancement of the alloying of Mg and Ni. The examples (A5) and (A6) made by application of the accelerations of 3 G and 6 G have the pressure-composition diagram equivalent to that of the example (A7) made by application of the acceleration of 9 G as in the usual production of an alloy. In the examples (A5) and (A6), the number of the Ni particles entering into one Mg particle is smaller than that in the example (A7), but many highly active Ni particles were deposited to the surface of the Mg particles, resulting in an excellent pressure-composition diagram.

EXAMPLE 3 OF PRODUCTION

An aggregate of Mg particles (as metal matrix particles) having a purity of 99.9% and a particle size D of 180 µm, and an aggregate of Ni particles and an aggregate of Fe particles (as added-component particles) each having a purity of 99.9% and a particle size d of 300 nm were weighed to provide an alloy composition of $Mg_{99.5}Ni_{0.33}Fe_{0.17}$ (unit of each of numerical values was % by atom), thereby producing a total of 1,100 g of a mixture powder. This mixture powder was placed into a container (made of JIS SUS316) having a volume of 24.1 L of a ball mill together with 5,500 balls (made of JIS SUS316) having a diameter of 10 mm, and subjected to ball milling with the inside of the container maintained at a hydrogen gas atmosphere of 1.0 MPa conditions of a container-rotational speed of 60 rpm and milling time t of 60 minutes. In this case, an acceleration 1 G equivalent to a gravity acceleration G was generated in the container. After the ball milling, the hydrogen absorbing alloy powder was taken up in the atmosphere. This alloy powder is hereinafter called an example (A9).

Figure 7:
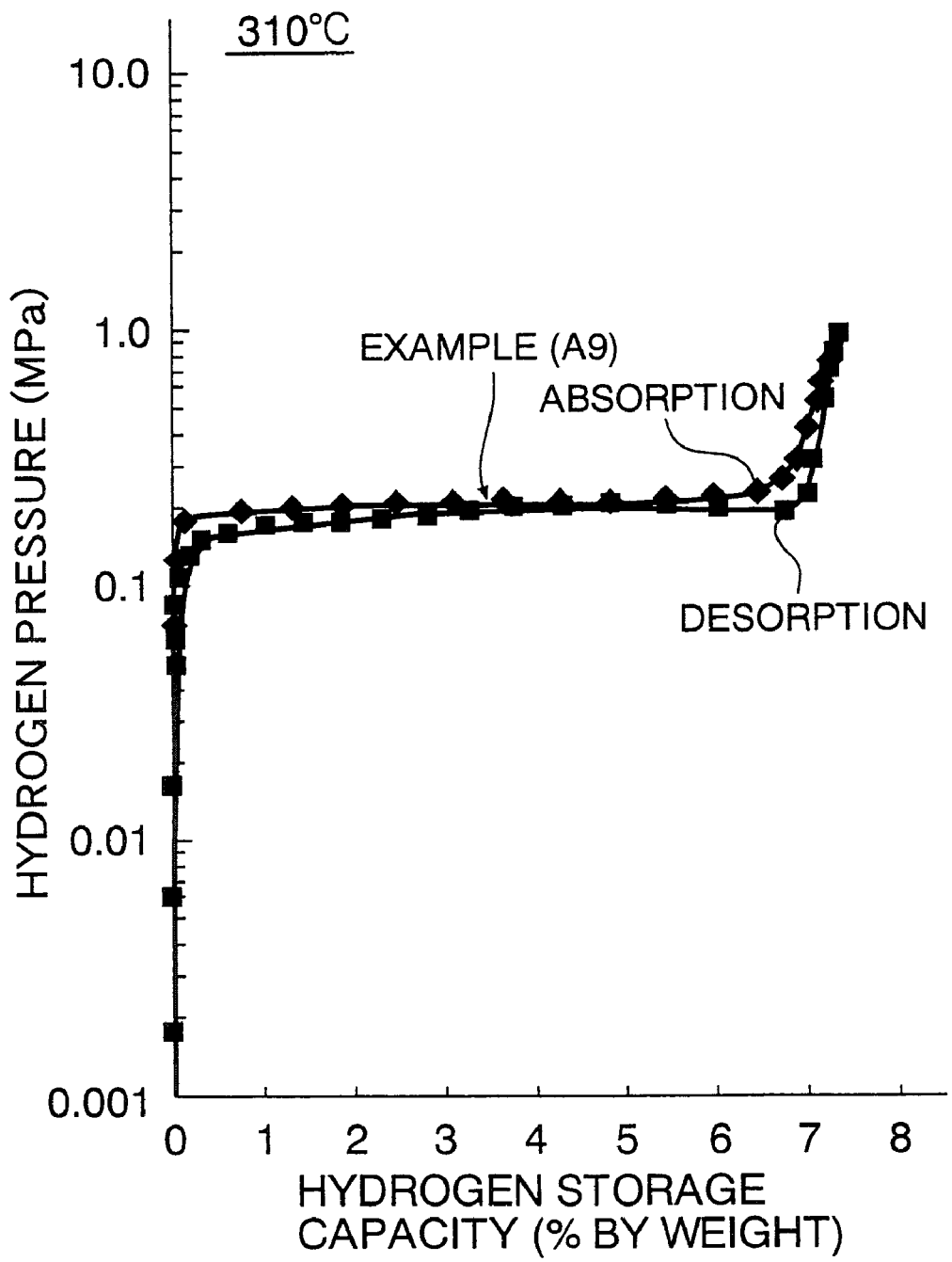
FIG. 7 is a pressure-composition diagram of an example (A9) of a hydrogen absorbing alloy powder.

The example (A9) was subjected to a dehydrogenating procedure under the same conditions as in Production Example 1 and then to a pressure-composition diagram. FIG. 7 shows the pressure-composition diagram (waiting time: 5 minutes; 310° C., absorption and desorption) of the example (A9). It can be seen from FIG. 7 that the example (A9) has the excellent pressure-composition diagram and particularly, has a small hysteresis of absorption and desorption of hydrogen, a high rate of hydrogen absorption and moreover, presents a large hydrogen storage capacity.

Second Embodiment

Figure 8:
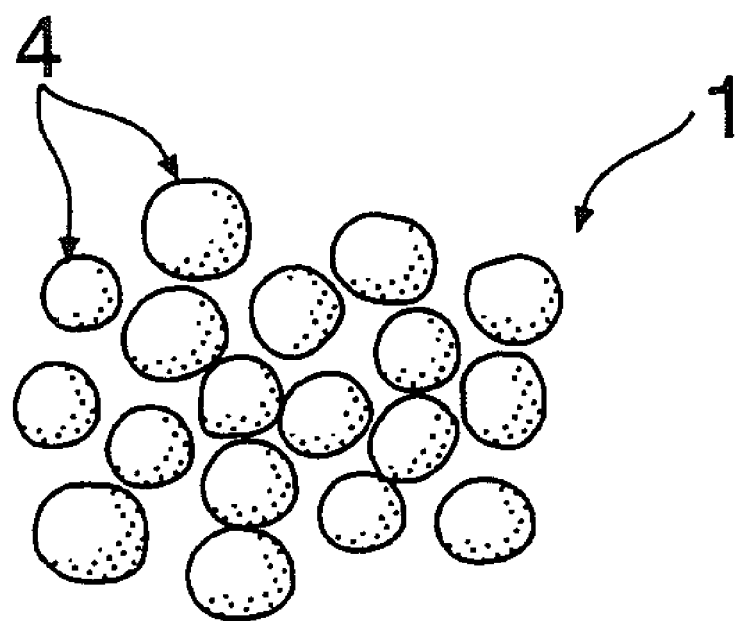
FIG. 8 is a diagram for explaining a hydrogen absorbing alloy powder.
Figure 9:
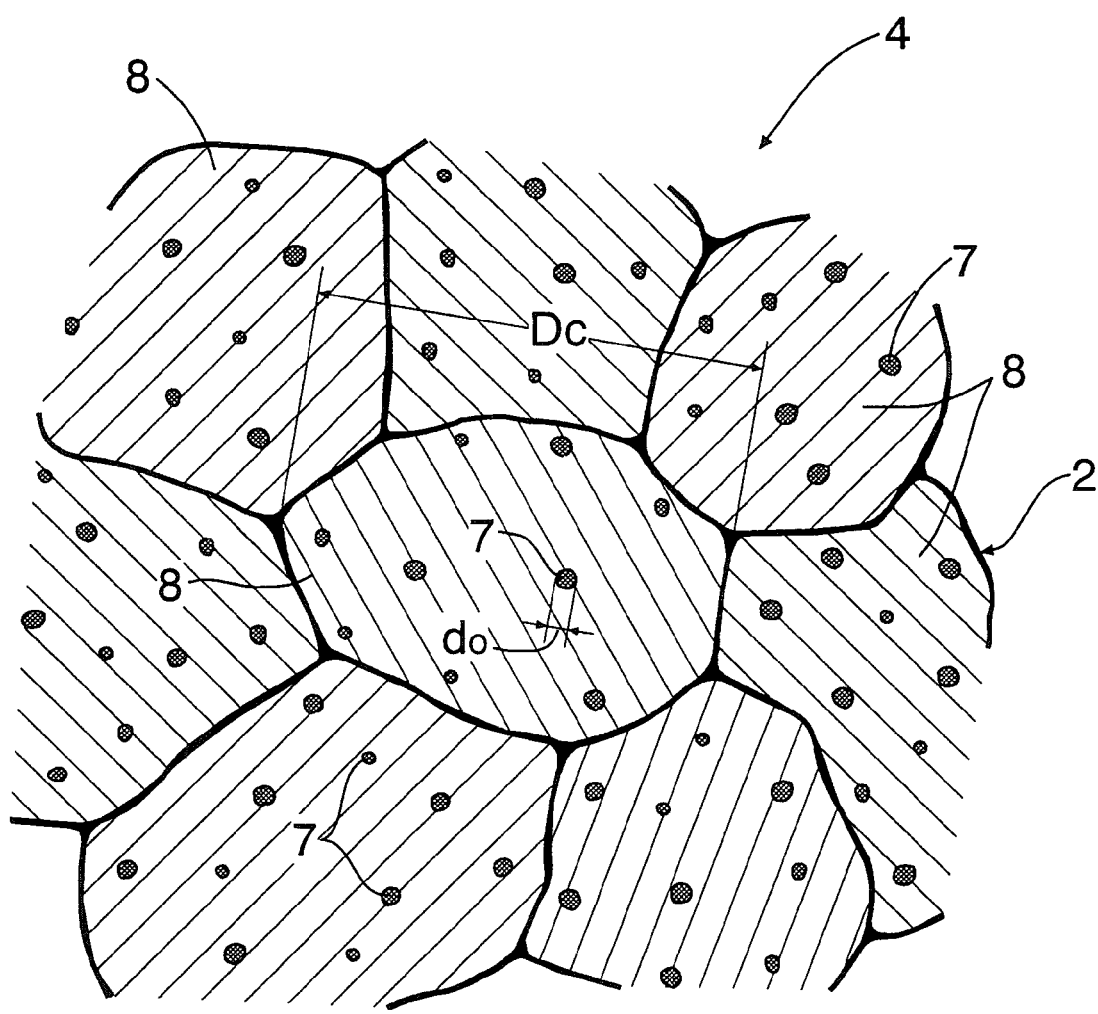
FIG. 9 is a diagram for explaining the metallographic structure of alloy particles.

Referring to FIGS. 8 and 9, a hydrogen absorbing alloy powder 1 is an aggregate of alloy particles 4. Each of the alloy particles 4 includes an Mg matrix 2 and a plurality of ultra-fine particles 7 dispersed in the Mg matrix 2. The Mg matrix 2 has a plurality of Mg crystals having a grain size $D_C$ in a range of 1.0 µm $\leq D_C \leq$ 500 µm, and the ultra-fine particles have a particle size $d_0$ in a range of 10 nm $\leq d_0 \leq$ 500 nm, preferably, $d_0 \geq$ 100 nm. In this case, the grain size $D_C$ of the Mg crystals 5 and the particle size $d_0$ of the ultra-fine particles 7 are defined to be lengths of longest portions of the crystals 5 and the particles 7 respectively in a microphotograph. The same definition is applied to cases described hereinafter. The Mg matrix 2 encompasses an Mg matrix including one or two or more Mg crystals which do not have the above-described grain size $D_C$, in addition to an Mg matrix comprising only Mg crystals having the above-described grain size $D_C$. The Mg crystals 8 which have the grain size $D_C$ may account for at least 50% of the Mg matrix 2.

The ultra-fine particles 7 which may be used are at least one type selected from the group consisting of Ni ultra-fine particles, Ni alloy ultra-fine particles, Fe ultra-fine particles, Fe alloy ultra-fine particles, V ultra-fine particles, V alloy ultra-fine particles, Mn ultra-fine particles, Mn alloy ultra-fine particles, Ti ultra-fine particles, Ti alloy ultra-fine particles, Cu ultra-fine particles, Cu alloy ultra-fine particles, Al ultra-fine particles, Al alloy ultra-fine particles, Pd ultra-fine particles, Pd alloy ultra-fine particles, Pt ultra-fine particles, Pt alloy ultra-fine particles, Zr ultra-fine particles, Zr alloy ultra-fine particles, Au ultra-fine particles, Au alloy ultra-fine particles, Ag ultra-fine particles, Ag alloy ultra-fine particles, Co ultra-fine particles, Co alloy ultra-fine particles, Mo ultra-fine particles, Mo alloy ultra-fine particles, Nb ultra-fine particles, Nb alloy ultra-fine particles, Cr ultra-fine particles, Cr alloy ultra-fine particles, Zn ultra-fine particles, Zn alloy ultra-fine particles, Ru ultra-fine particles, Ru alloy ultra-fine particles, Rh ultra-fine particles, Rh alloy ultra-fine particles, Ta ultra-fine particles, Ta alloy ultra-fine particles, Ir ultra-fine particles, Ir alloy ultra-fine particles, W ultra-fine particles and W alloy ultra-fine particles.

The hydrogen absorbing alloy powder 1 has a very high activity attributable to a fine metallographic structure and hence, presents a large hydrogen storage capacity and a high rate of hydrogen absorption/desorption without an activating procedure, because the powder 1 is the aggregate of the alloy particles 4 including the Mg matrix 2 having the crystal grain size $D_C$ on the order of μm in which the ultra-fine particles 7 having the particle size $d_0$ on the order of nm are dispersed as described above.

In order to ensure a hydrogen storage capacity of 6% by weight, the content $G_P$ of the ultra-fine particles 7 is set in a range of 0.1% by atom $\leq G_P \leq$ 5.0% by atom. If the content $G_P$ is smaller than 0.1% by atom, the meaning of use of the ultra-fine particles 7 is lost. On the other hand, if the content $G_P$ is larger than 5.0% by atom, the hydrogen storage capacity becomes smaller than 6% by weight. The content $G_P$ of the ultra-fine particles 7 is preferably in a range of 0.3% by atom $\leq G_P \leq$ 3.0% by atom, whereby an hydrogen storage capacity of 7.0% by weight or more can be ensured.

The hydrogen absorbing alloy powder 1 may be, in addition to those described above, an aggregate of alloy particles 4 which includes a Ti—Fe alloy matrix 2 and a plurality of ultra-fine particles 7 similar to those described above, dispersed in the Ti—Fe alloy matrix 2. In this case, the Ti—Fe alloy matrix 2 includes a plurality of Ti—Fe alloy crystals 8 having a grain size $D_C$ in a range of 1.0 μm $\leq D_C \leq$ 500 μm, and the ultra-fine particles 7 have a particle size $d_0$ in a range of 10 nm $\leq d_0 \leq$ 500 nm, preferably, $d_0 \geq$ 100 nm. For the same reason as described above, the content $G_P$ of the ultra-fine particles 7 is in a range of 0.1% by atom $\leq G_P \leq$ 5.0% by atom, preferably, in a range of 0.3% by atom $\leq G_P \leq$ 3.0% by atom. The Ti—Fe alloy matrix 2 encompasses a matrix including one or two or more Ti—Fe alloy crystals which do not have the above-described grain size $D_C$, in addition to a matrix comprising only Ti—Fe alloy crystals 8 which have the above-described grain size $D_C$. The Ti—Fe alloy crystals 8 having the above-described grain size $D_C$ may account for at least 50% of the Ti—Fe alloy matrix 3.

To produce the hydrogen absorbing alloy powder 1, a process is employed, in which one of mechanical alloying or mechanical grinding is carried out using an Mg matrix powder which is an aggregate of Mg matrix particles and a ultra-fine particle powder which is an aggregate of ultra-fine particles 7, or using a Ti—Fe alloy matrix powder which is an aggregate of Ti—Fe alloy matrix particles and a ultra-fine particle powder which is an aggregate of ultra-fine particles. In this case, the particle sizes D of the Mg matrix particles and the Ti—Fe alloy matrix powder are suitable to be in a range of 3 μm $\leq D \leq$ 2,000 μm. If the particle size D is smaller than 3 μm, the handleability of the matrix particles is degraded because of a high activity thereof. On the other hand, if the particle size D is larger than 2,000 μm, the hydrogen storage capacity in the hydrogen absorbing alloy powder is smaller, and the rate of hydrogen absorption/desorption is lower.

EXAMPLE 1 OF PRODUCTION

An aggregate of Mg matrix particles having a purity of 99.9% and a particle size D of 500 μm or less, an aggregate of Ni ultra-fine particles having a purity of 99.9% and a particle size $d_0$ in a range of 20 nm $\leq d_0 \leq$ 400 nm (an average particle size of 200 nm) and an aggregate of Fe ultra-fine particles having a purity of 99.9% and a particle size $d_0$ in a range of 100 nm $\leq d_0 \leq$ 500 nm (an average particle size of 300 nm) were prepared. These particles were weighed so that a sum of contents of the aggregate of the Ni ultra-fine particles and the aggregate of the Fe ultra-fine particles relative to the aggregate of the Mg matrix particles is changed from 0.05% by atom to 10.0% by atom, while maintaining a ratio between the Ni ultra-fine particle content and the Fe ultra-fine particle content is nearly equal to 2:1, thereby producing 15 types of mixture powders in a total amount of 100 g and at different ratios of components mixed.

Each of the mixture powders was placed into a container (made of JIS SUS316) having a volume of 2,500 ml of a ball mill (made by Honda) together with 990 balls (made of JIS SUS316) having a diameter of 10 mm, and subjected to ball milling with the inside of the container maintained at a hydrogen gas atmosphere of 1.0 MPa under conditions of a container-rotational speed of 64 rpm and milling time t of 4 hours. In this case, an acceleration of 0.2 G 0.2-times a gravity acceleration $G_P$ was generated in the container. After the ball milling, the hydrogen absorbing alloy powder was taken up in the atmosphere.

Each of the hydrogen absorbing alloy powders was hydrogenated in the course of the ball milling and hence, subjected to a dehydrogenating procedure comprising evacuation at 350° C. for one hour, and then to a hydrogen-absorption test conducted at a measuring temperature of 310° C. by applying a high hydrogen pressure of 1.1 MPa from a vacuum state.

Table 1 shows the grain size $D_C$ of Mg crystals in an Mg matrix, the sum of the contents of the Ni ultra-fine particles and Fe ultra-fine particles (Ni+Fe with the remainder of Mg), namely, the content $G_P$ of the ultra-fine particles, the ratio (between Ni and Fe) in the content $G_P$, and the hydrogen storage capacity $S_H$ for the examples (1) to (15) of the hydrogen absorbing alloy powders.

TABLE 1

| Hydrogen absorbing alloy powder | Grain size D (μm) of Mg crystals in Mg matrix | Content GP (% by atom) of Ni and Fe ultra-fine particles | | | Hydrogen Storage capacity $S_H$ (% by weight) |
|---|---|---|---|---|---|
| | | Ni + Fe | Ni | Fe | |
| Example 1 | 500 $\leq$ $\leq$ 800 | 0.05 | 0.033 | 0.017 | 5.4 |
| Example 2 | 200 $\leq$ $\leq$ 450 | 0.10 | 0.067 | 0.033 | 6.8 |
| Example 3 | 50 $\leq$ $\leq$ 400 | 0.20 | 0.134 | 0.066 | 6.8 |
| Example 4 | 5 $\leq$ $\leq$ 400 | 0.30 | 0.200 | 0.100 | 7.4 |
| Example 5 | 1.5 $\leq$ $\leq$ 280 | 0.50 | 0.333 | 0.167 | 7.4 |
| Example 6 | 3 $\leq$ $\leq$ 350 | 0.70 | 0.467 | 0.233 | 7.4 |
| Example 7 | 2 $\leq$ $\leq$ 330 | 1.00 | 0.667 | 0.333 | 7.3 |
| Example 8 | 1.1 $\leq$ $\leq$ 350 | 1.50 | 1.000 | 0.500 | 7.2 |
| Example 9 | 4 $\leq$ $\leq$ 390 | 2.00 | 1.333 | 0.667 | 7.2 |

TABLE 1-continued

| Hydrogen absorbing alloy powder | Grain size D (μm) of Mg crystals in Mg matrix | Content GP (% by atom) of Ni and Fe ultra-fine particles | | | Hydrogen Storage capacity $S_H$ (% by weight) |
|---|---|---|---|---|---|
| | | Ni + Fe | Ni | Fe | |
| Example 10 | 3 ≦ ≦ 400 | 3.00 | 2.000 | 1.000 | 7.0 |
| Example 11 | 3.5 ≦ ≦ 410 | 4.00 | 2.667 | 1.333 | 6.4 |
| Example 12 | 2.5 ≦ ≦ 300 | 5.00 | 3.333 | 1.667 | 6.2 |
| Example 13 | 1.5 ≦ ≦ 320 | 6.00 | 4.000 | 2.000 | 5.3 |
| Example 14 | 1.9 ≦ ≦ 250 | 8.00 | 5.333 | 2.667 | 5.0 |
| Example 15 | 2 ≦ ≦ 100 | 10.00 | 6.667 | 3.333 | 1.9 |

Figure 10:
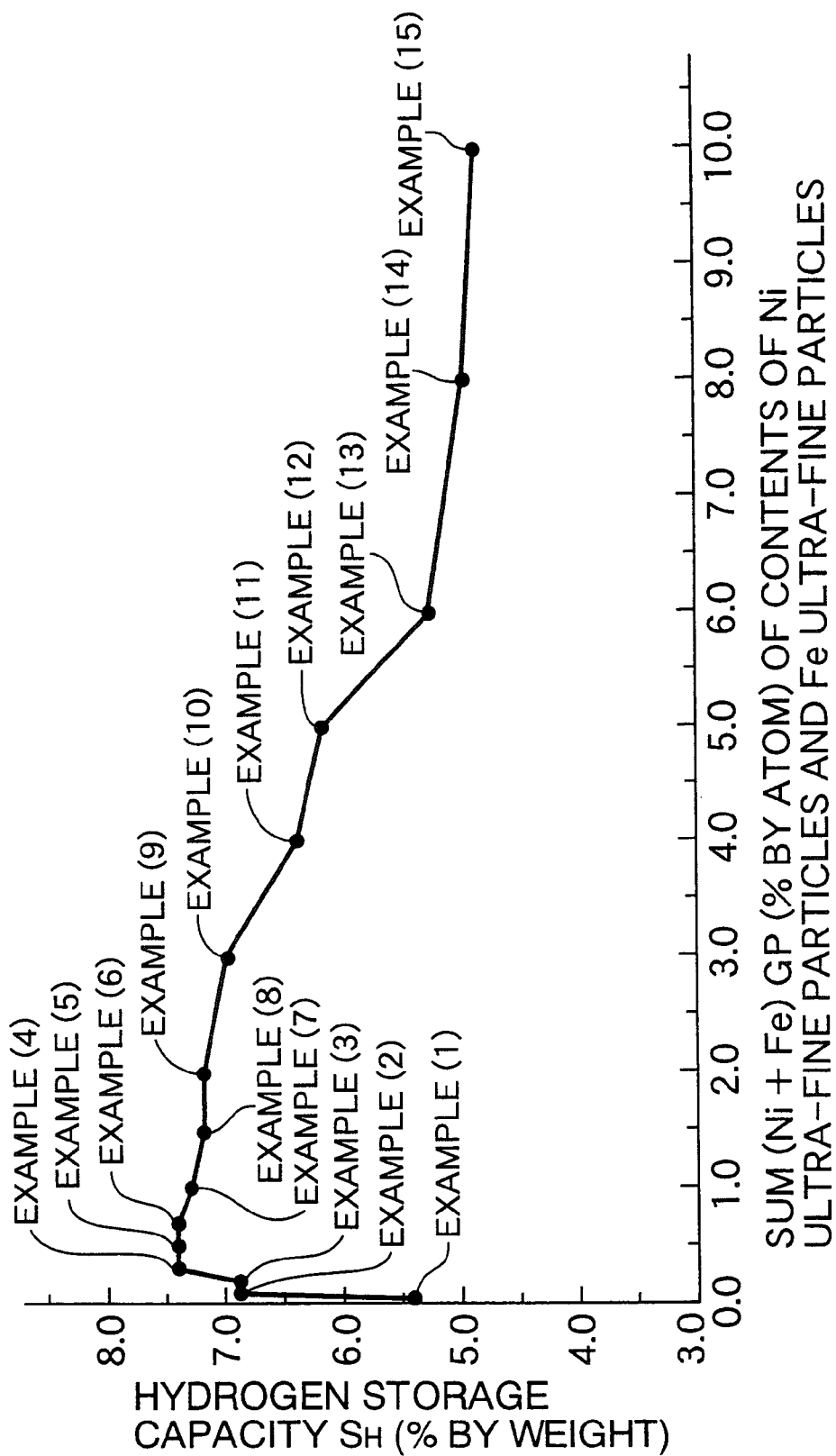
FIG. 10 is a graph showing the relationship between the sum (Ni+Fe) $G_P$ of contents of Ni ultra-fine particles and Fe ultra-fine particles and the hydrogen storage capacity $S_H$ for examples (1) to (15) of hydrogen absorbing alloy powders.

FIG. 10 is a graph made based on Table 1 and showing the relationship between the sum (Ni+Fe) $G_P$ of the contents of the Ni ultra-fine particles and the Fe ultra-fine particles, and the hydrogen storage capacity $S_H$. As apparent from Table 1 and FIG. 10, in the cases of the examples (2) to (12), the hydrogen storage capacity $S_H$ was increased to $S_H \leq 6\%$ by weight, because the grain size $D_C$ of Mg crystals in the Mg matrix was in the range of 1.0 μm≦$D_C$≦500 μm, and the sum (Ni+Fe) of the contents, namely, the content $G_P$ was set in the range of 0.10% by atom≦$G_P$≦5.0% by atom. Particularly, if the content $G_P$ is set in a range of 0.3% by atom≦$G_P$≦3.0% by atom as in the examples (4) to (10), the hydrogen storage capacity $S_H$ can be further increased to a range of 7.0% by weight≦$S_H$≦7.4% by weight.

Figure 11:
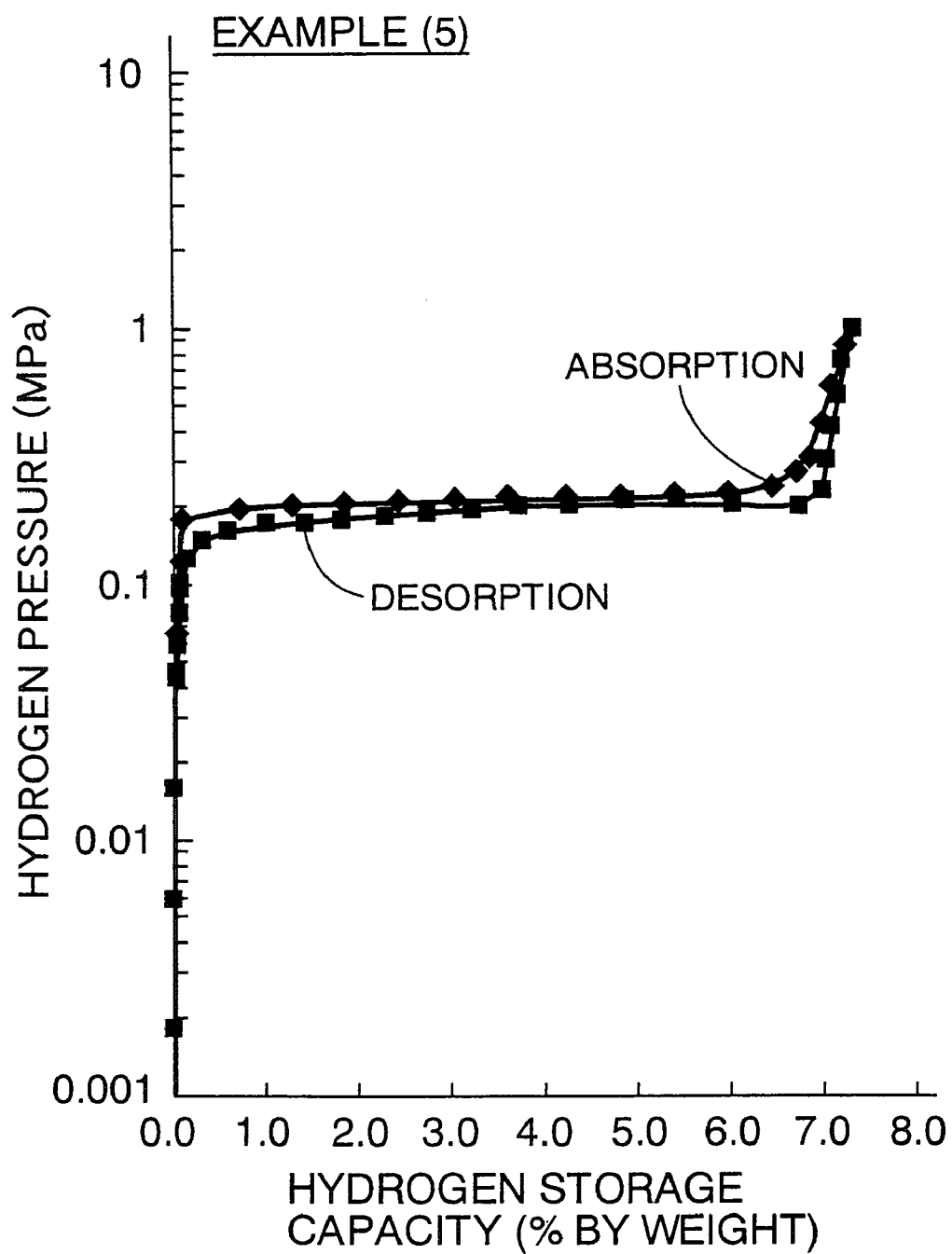
FIG. 11 is a pressure-composition diagram of the example (5) of the hydrogen absorbing alloy powder.
Figure 12:
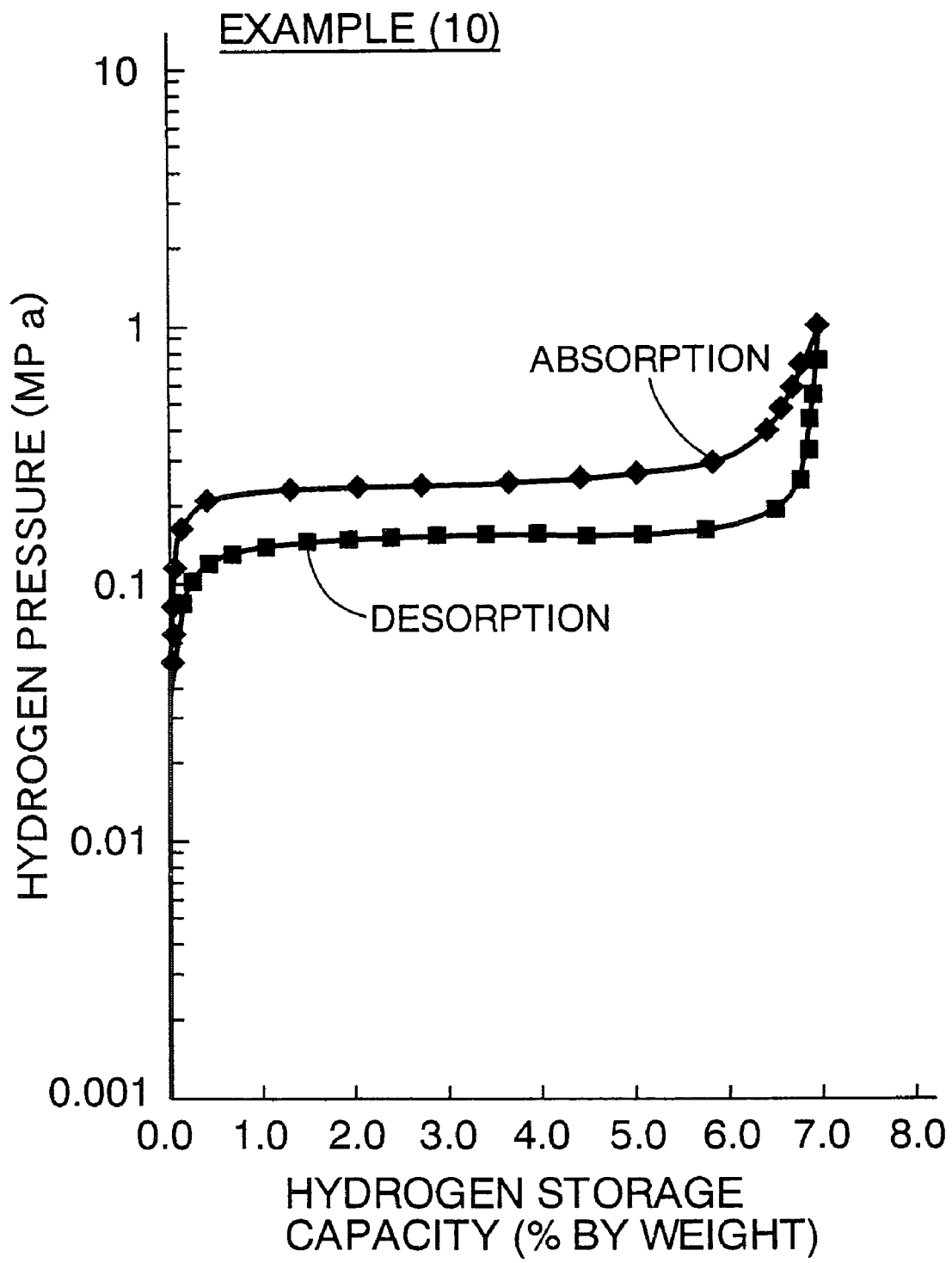
FIG. 12 is a pressure-composition diagram of the example (10) of the hydrogen absorbing alloy powder.

Then, the examples (5) and (10) provided after the dehydrogenating procedure were subjected to measurement for a pressure-composition diagram. FIGS. 11 and 12 show the pressure-composition diagrams (waiting time: 5 minutes; 310° C., absorption and desorption) of the examples (5) and (10), respectively. It can be seen from FIGS. 13 and 14 that the hydrogen storage capacities in the examples (5) and (10) are as large as 7.4% by weight and 7.0% by weight respectively, the hydrogen absorption/desorption rate is very high and hence, maximum amounts of hydrogen absorbed and desorbed are presented in the waiting time of 5 minutes.

EXAMPLE 2 OF PRODUCTION

An aggregate of matrix particles of a $Ti_{50}Fe_{50}$ alloy (unit of each of numerical values is % by atom) having a purity of 99.9% and a particle size D≦300 μm, and an aggregate of Fe ultra-fine particles having a purity of 99.9% and a particle size $d_0$ in a range of 100 nm≦$d_0$≦500 nm (an average particle size of 300 nm) were prepared. These particles were weighed so that the content of the Fe ultra-fine particles relative to the aggregate of the matrix particles of the $Ti_{50}Fe_{50}$ alloy was equal to 1% by atom, thereby producing a total of 25 g of a mixture powder.

The mixture powder was placed into a container (made of JIS SUS316) having a volume of 800 ml of a ball mill (made by Honda) together with 180 balls (made of JIS SUS316) having a diameter 10 mm, and subjected to ball milling with the inside of the container maintained at a hydrogen gas atmosphere of 1.0 MPa under conditions of a container-rotational speed of 85 rpm and milling time t of 1 hour. In this case, an acceleration 0.1 G 0.1-times a gravity acceleration $G_P$ was generated in the container. After the ball milling, the hydrogen absorbing alloy powder was taken up in the atmosphere. The grain size $D_C$ of $Ti_{50}Fe_{50}$ alloy crystals in the $Ti_{50}Fe_{50}$ alloy matrix of the hydrogen absorbing alloy powder was in a range of 1.5 μm≦$D_C$≦450 μm. This alloy powder is hereinafter called an example (16).

Figure 13:
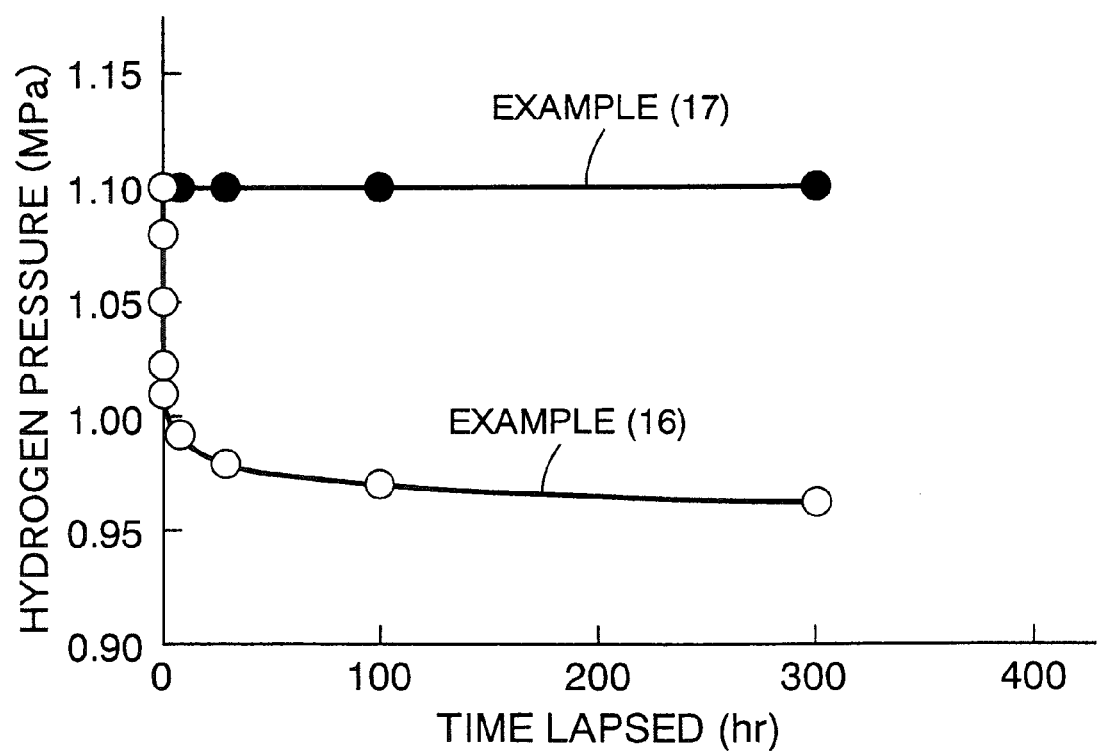
FIG. 13 is a diagram showing hydrogen-absorption characteristics of the examples (16) and (17) of the hydrogen absorbing alloy powders.

The example (16) was subjected to a dehydrogenating procedure under the same conditions as in Production Example 1, and a hydrogen pressure is set at 1.1 MPa using a PCT apparatus, and a variation in hydrogen pressure with the passage of time was measured. FIG. 13 shows results of the measurement, wherein an example (17) corresponds to a conventional hydrogen absorbing alloy powder made by casting and having the same composition as the example (16). As apparent from FIG. 13, it can be seen that in the example (16), the hydrogen absorption occurred simultaneously with the introduction of hydrogen, despite the lower hydrogen pressure. In the example (17), the hydrogen absorption did not occur even after lapse of 300 hours, because of the lower activity of the example (17) and the lower hydrogen pressure in the example (17).

(Hydrogen-Storing Tank Adapted to be Mounted on Vehicle)

Figure 14:
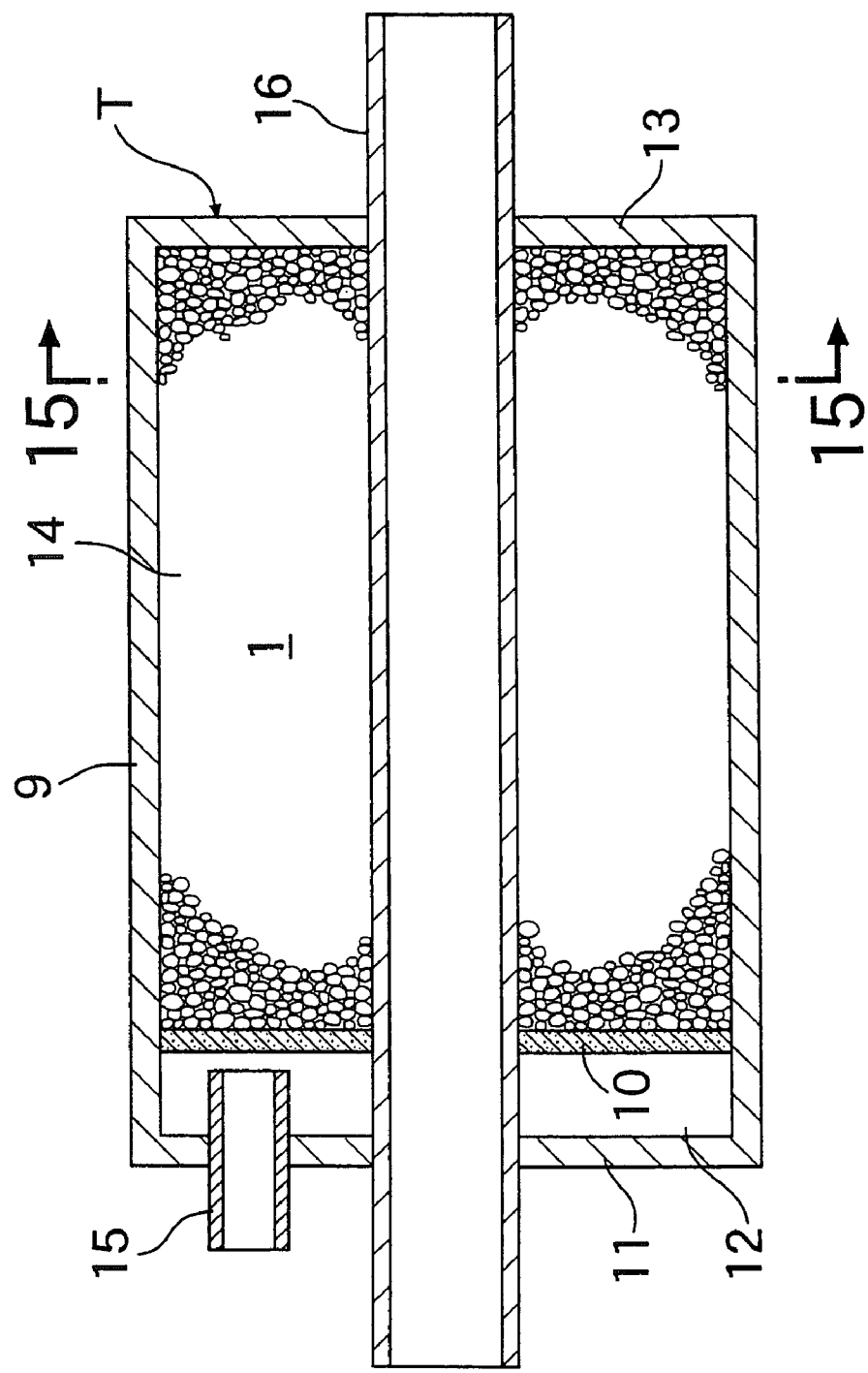
FIG. 14 is a vertical sectional front view of one example of a hydrogen-storing tank for mounting in a vehicle.
Figure 15:
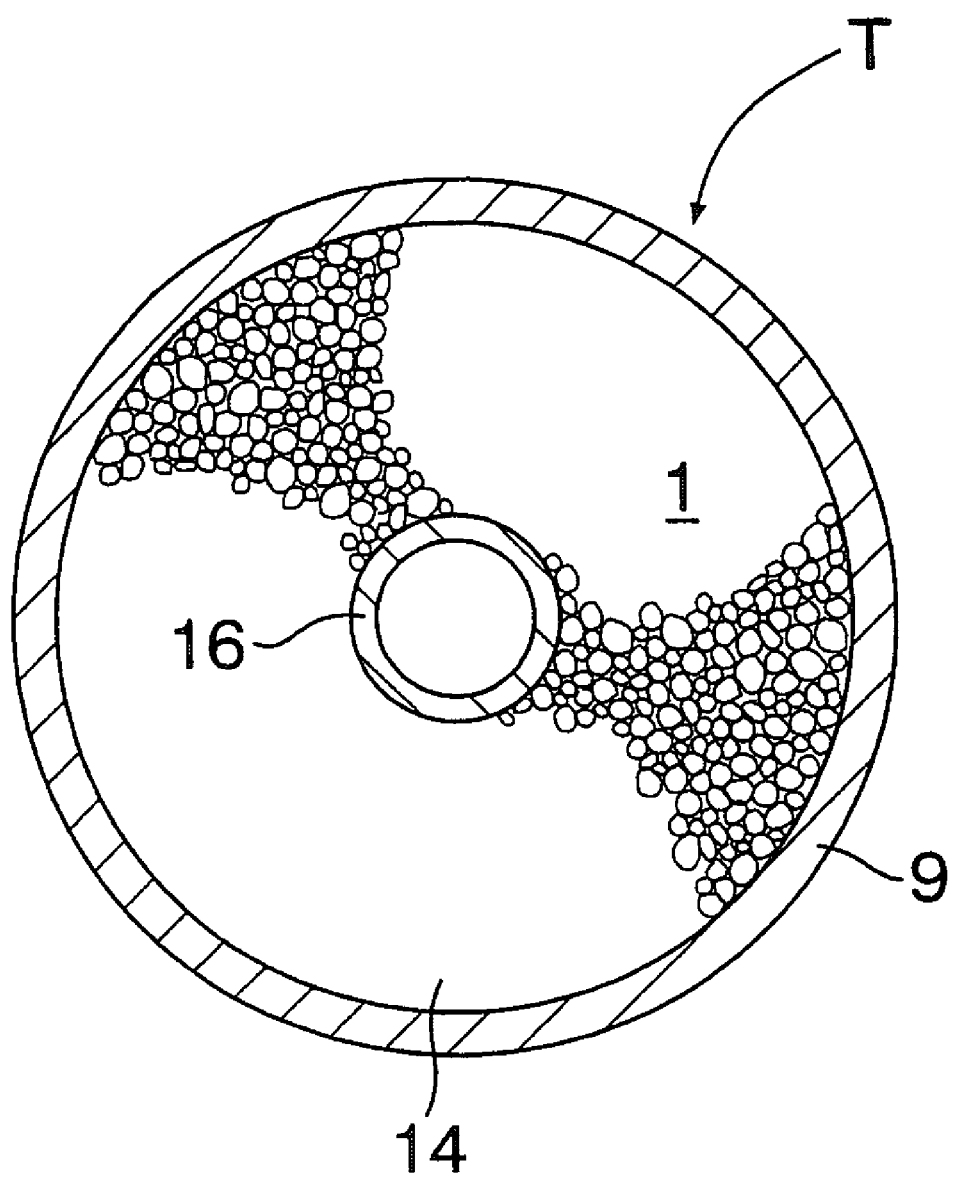
FIG. 15 is a sectional view taken along line 15—15 in FIG. 14.

A hydrogen-storing tank T for mounting in a vehicle, shown in FIGS. 14 and 15, includes a pressure-resistant outer shell 9 having a circular cross section and made of a stainless steel or the like. The inside of the outer shell 9 is divided into a small space 12 on the side of one end wall 11 and a large space 14 on the side of the other end wall 13 by a permeable filter 10 made of nickel (Ni). The permeable filter 10 has a large number of fine pores through which hydrogen can enter and exit, e.g., pores having a diameter of several nm to 0.5 μm. In addition to nickel, a metal material such as a stainless steel, ceramics or the like may be used as a material for forming the permeable filter 10.

A hydrogen absorbing alloy powder 1 is filled in the large space 14, and a communication pipe 15 is retained through the one end wall 11 on the side of the small space 12, so that hydrogen to be absorbed and desorbed flows through the pipe 15.

A pipe 16 made of a stainless steel or the like is mounted with its axis aligned with an axis of the outer shell 9 to extend through the outer shell 9, the permeable filter 10 and the hydrogen absorbing alloy powder 1, and portions of the opposite end walls 11 and 13 and the permeable filter 10 through which the pipe 16 passes are sealed. The inside of the pipe 16 is used as a passage through which a cooling fluid flows when hydrogen is absorbed, and as a passage through which a heating fluid flows when hydrogen is desorbed.

The previously described powder is used as the hydrogen absorbing alloy powder 1. More specifically, the power is an aggregate of alloy particles including an Mg matrix and a plurality of ultra-fine particles dispersed in the Mg matrix. The Mg matrix has a plurality of Mg crystals having a crystal grain size $D_C$ in a range of 1.0 μm≦$D_C$≦500 μm, and the ultra-fine particles have a particle size $d_0$ in a range of 10 nm≦$d_0$≦500 nm. The ultra-fine particles are at least one type selected from the group consisting of Ni ultra-fine particles, Ni alloy ultra-fine particles, Fe ultra-fine particles, Fe alloy ultra-fine particles, V ultra-fine particles, V alloy ultra-fine particles, Mn ultra-fine particles, Mn alloy ultra-fine particles, Ti ultra-fine particles, Ti alloy ultra-fine particles, Cu ultra-fine particles, Cu alloy ultra-fine particles, Al ultra-fine particles, Al alloy ultra-fine particles, Pd ultra-fine particles, Pd alloy ultra-fine particles, Pt ultra-fine particles, Pt alloy ultra-fine particles, Zr ultra-fine particles, Zr alloy ultra-fine particles, Au ultra-fine particles, Au alloy ultra-fine particles, Ag ultra-fine particles, Ag alloy ultra-fine particles, Co ultra-fine particles, Co alloy ultra-fine particles, Mo ultra-fine particles, Mo alloy ultra-fine particles, Nb ultra-fine particles, Nb alloy ultra-fine particles, Cr ultra-fine particles, Cr alloy ultra-fine particles, Zn ultra-fine particles, Zn alloy ultra-fine particles, Ru ultra-fine particles, Ru alloy ultra-fine particles, Rh ultra-fine particles, Rh alloy ultra-fine particles, Ta ultra-fine particles, Ta alloy ultra-fine particles, Ir ultra-fine particles, Ir alloy ultra-fine particles, W ultra-fine particles and W alloy ultra-fine particles.

The hydrogen-storing tank T contains a hydrogen absorbing alloy powder which presents a large hydrogen storage capacity and a high rate of hydrogen absorption, as described above and hence, the hydrogen-storing tank T is suitable to be mounted in a vehicle.

The invention claimed is:

1. A hydrogen absorbing alloying powder which is an aggregate of alloy particles each including an Mg matrix and a plurality of ultra-fine particles dispersed in said Mg matrix, said Mg matrix including a plurality of Mg crystals having a grain size $D_C$ of 1.0 μm or more and 500 μm or less, and said ultra-fine particles having a particle size $d_0$ of 10 nm$\leq d_0 \leq$500 nm, said ultra-fine particles comprising a plurality of Ni ultra-fine particles and a plurality of Fe ultra-fine particles, the content $G_P$ of said ultra-fine particles being in a range of 0.1% by atom$\leq G_P \leq$5.0% by atom.

2. A hydrogen absorbing alloy powder according to claim 1, wherein the particle size $d_0$ of said ultra-fine particles is equal to or larger than 100 nm.

3. A hydrogen absorbing alloy powder according to claim 1 or 2, wherein the content $G_P$ of said ultra-fine particles is in a range of 0.3% by atom$\leq G_P$3.0% by atom.

4. A hydrogen storing tank for mounting in a vehicle and including a hydrogen absorbing alloy powder therein, said hydrogen absorbing alloy powder being an aggregate of alloy particles each included an Mg matrix and a plurality of ultra-fine particles dispersed in said Mg matrix, said Mg matrix including a plurality of Mg alloy crystals having a grain size $D_C$ in a range of 1.0 μm$\leq D_C \leq$500 μm, said ultra-fine particles having a particle size $d_0$ in a range of 10 nm$\leq d_0 \leq$500 nm, said ultra-fine particles comprising a plurality of Ni ultra-fine particles and a plurality of Fe ultra-fine particles, the content $G_P$ of said ultra-fine particles being a range of 0.1% by atom$\leq G_P \leq$5.0% by atom.

* * * * *